April 2, 1957  J. F. JONES  2,787,083
BUG AND MOSQUITO CATCHER
Filed Nov. 8, 1955  2 Sheets-Sheet 1
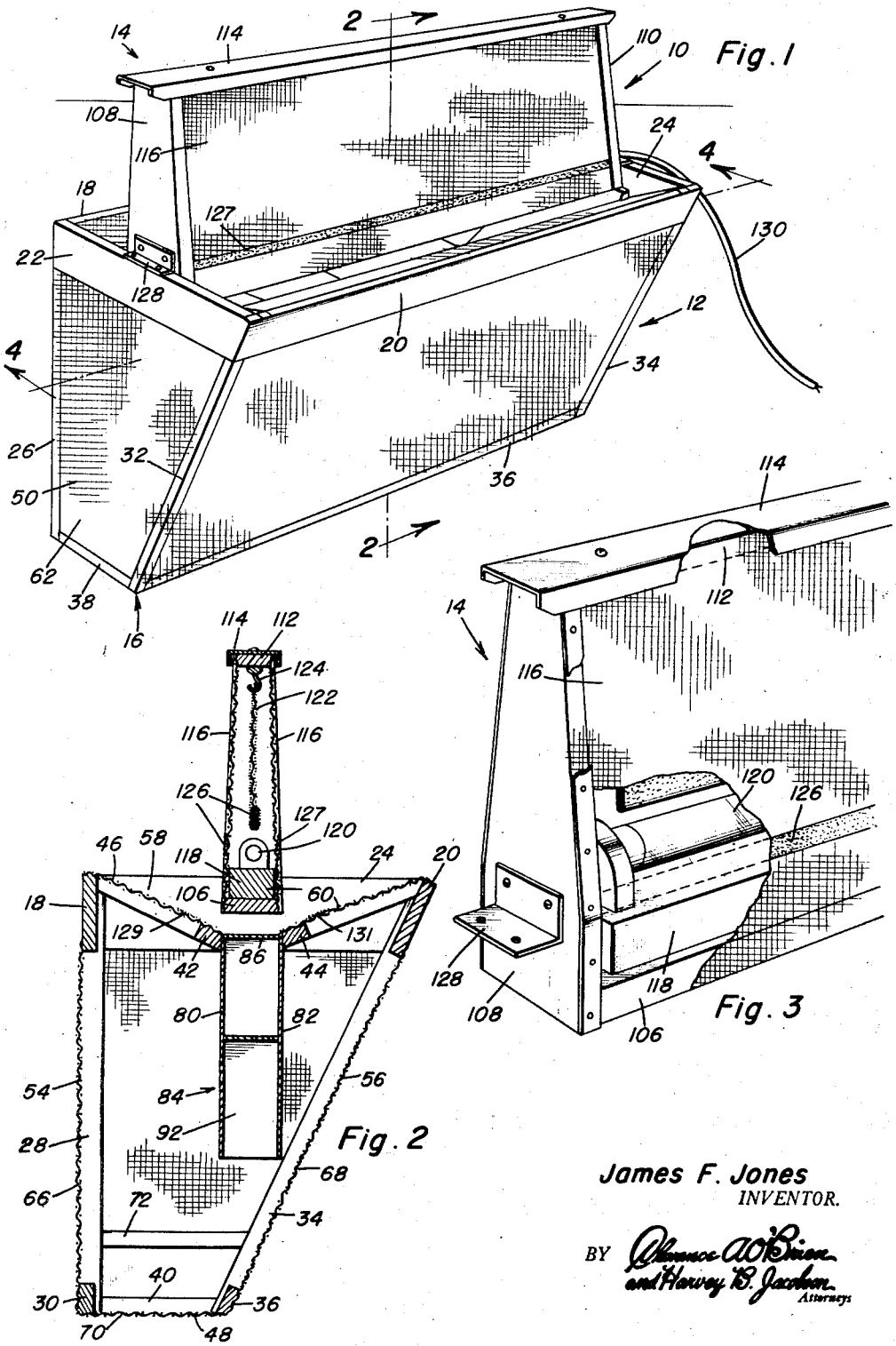
James F. Jones
INVENTOR.

April 2, 1957  J. F. JONES  2,787,083
BUG AND MOSQUITO CATCHER
Filed Nov. 8, 1955  2 Sheets-Sheet 2

James F. Jones
INVENTOR.

BY
*Attorneys*

United States Patent Office 2,787,083
Patented Apr. 2, 1957

2,787,083

BUG AND MOSQUITO CATCHER

James F. Jones, Snow Hill, N. C.

Application November 8, 1955, Serial No. 545,661

6 Claims. (Cl. 43—113)

This invention relates in general to new and useful improvements in trap construction, and more specifically to an improved bug and mosquito catcher.

The primary object of this invention is to provide an improved bug and mosquito catcher which is so constructed whereby bugs of a large area are attracted to the catcher and induced to enter into the receptacle portion thereof whereby the bugs are securely trapped.

Another object of this invention is to provide an improved bug and mosquito catcher which utilizes an insect attractive paint so arranged on opposite sides of an opening into the receptacle of the catcher whereby insects are not only attracted to the catcher, but are induced into entering into the receptacle.

Still another object of this invention is to provide an improved bug catcher which includes a receptacle for bugs, the bug catcher having an opening in the top thereof and the underside of the top wall being provided with an insect attractive coating, the coating being separated from the opening by suitable baffles whereby insects and bugs having entered the receptacle will be attracted to the underside of the top wall on the opposite sides of the baffles of the opening so as to prevent their escape.

A further object of this invention is to provide an improved receptacle for bug and mosquito catchers, the receptacle being of a self cleaning type and having a mesh bottom wall which is of a relatively wide gauge mesh so that parts of insect and bug bodies may conveniently fall therethrough.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the bug and mosquito catcher which is the subject of this invention and shows the general details thereof;

Figure 2 is an enlarged transverse vertical sectional view taken substantially upon the plane indicated by the section line 2—2 of Figure 1 and shows the specific details of the receptacle and the insect attractive member of the bug and mosquito catcher;

Figure 3 is an enlarged fragmentary perspective view of the insect attractive member removed from the receptacle and shows the specific details thereof;

Figure 4:
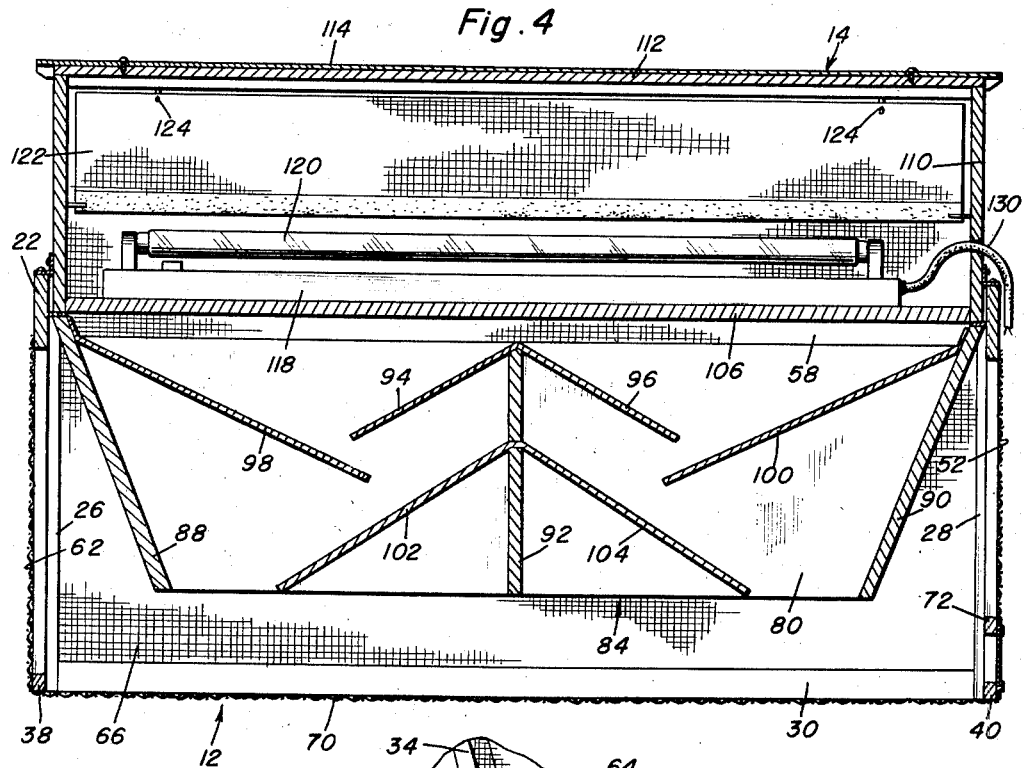
Figure 5:
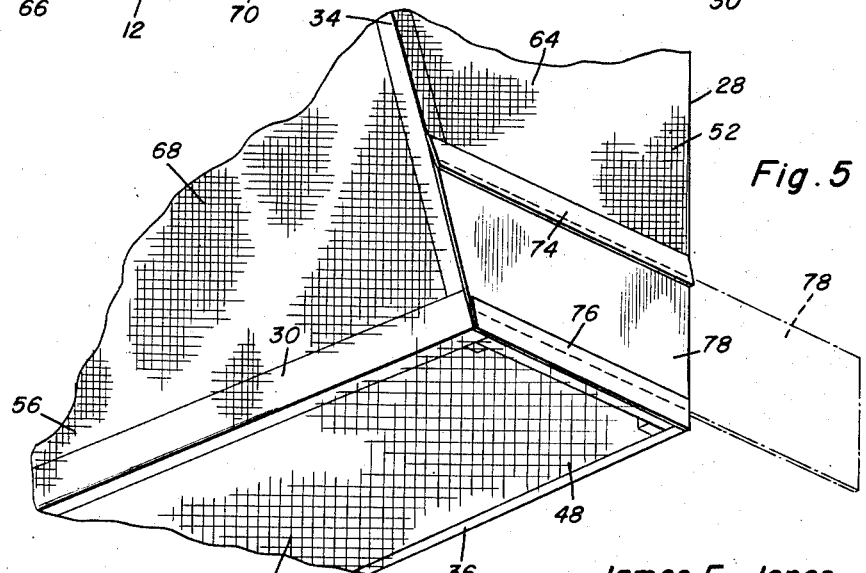

Figure 4 is an enlarged longitudinal sectional view taken substantially upon the plane indicated by the section line 4—4 of Figure 1 and shows the specific details of the construction of both the insect attractive member and the receptacle including a baffle system in the receptacle restraining the escape of insects; and Figure 5 is an enlarged fragmentary perspective view of the lower part of the receptacle and shows the specific details of both the bottom wall construction thereof and a clean out panel.

Referring now to the drawings in detail, it will be seen that there is best illustrated in Figure 1 the bug and mosquito catcher which is the subject of this invention, the bug and mosquito catcher being referred to in general by the reference numeral 10. The bug and mosquito catcher 10 is formed primarily of two main parts which includes a receptacle, which is referred to generally by the reference numeral 12 and an insect attractive member which is referred to in general by the reference numeral 14.

The receptacle 12 includes a frame which is referred to in general by the reference numeral 16. The frame 16 includes a pair of upper frame rails 18 and 20 which are connected together at their opposite ends by upper end frame members 22 and 24, the frame rails 18 and 20 and the end frame members 22 and 24 being arranged in a generally rectangular pattern.

Depending from the frame rail 18 at the intersection thereof with the end frame member 22 is a vertical frame member 26. A similar frame member 28 is disposed in depending relation from the intersection of the frame rail 18 and the end frame member 24. The lower ends of the vertical frame members 26 and 28 are connected together by a lower frame rail 30.

Sloping downwardly from the intersection of the frame rail 20 and the end frame member 22 is a frame member 32. A similar frame member 34 slopes downwardly from the intersection of the frame rail 20 and the end frame member 24. The lower ends of the frame members 32 and 34 are connected together by a lower longitudinal frame rail 36. The frame rails 30 and 36 are connected together by lower end frame members 38 and 40.

Referring now to Figure 2 in particular, it will be seen that the frame 16 also includes a pair of upper longitudinal frame members 42 and 44 which are disposed below the upper edges of the frame rails 18 and 20 and which extend between the end frame members 22 and 24 and are permanently secured thereto.

From the foregoing description of the frame 16, it will be seen that the receptacle 12 includes a top wall 46, a bottom wall 48 and upright walls including end walls 50 and 52 and side walls 54 and 56.

In order to form the top wall 46, there is provided a suitable mesh covering 58 and 60. A similar mesh covering 62 and 64 form the end walls 50 and 52, respectively. Other mesh coverings 66 and 68 form the side walls 54 and 56, respectively. The bottom wall 48 is formed by a mesh covering 70 which is of a wider mesh than the previously described mesh for a reason to be set forth in more detail hereinafter.

Extending transversely between the frame members 28 and 34 above the frame member 40 is an intermediate frame member 72 which is disposed in spaced parallel relation to the frame member 40. Secured to the exterior service of the frame member 72 is a guide 74, as is best illustrated in Figure 5. A similar guide 76 is secured to the exterior surface of the frame member 40. Slidably disposed between the guides 74 and 76 and enclosing the opening between the frame members 72 and 40 is a removable plate 78 which may be considered a clean out plate inasmuch as it may be moved to its broken line position of Figure 5 to facilitate the cleaning of dead insects from the receptacle 12.

Depending from the frame members 42 and 44 in spaced parallel relation are depending baffles 80 and 82 of a baffle system which is referred to in general by the reference numeral 84. The baffles 80 and 82 together with the frame members 42 and 44 define an entrance opening 86 in the top wall 46.

The baffle system 84 also includes a pair of end plates 88 and 90 which extend between and connect together the depending baffles 80 and 82. The baffles 80 and 82 are also connected together by an intermediate plate 92.

In addition to the depending baffles 80 and 82, the baffle system 84 includes other baffles in the form of central outwardly and downwardly sloping baffles 94 and 96 disposed on opposite sides of the intermediate plate 92. The baffle 94 terminates above the lower end of a baffle 98 which extends inwardly and downwardly from the upper part of the end plate 88. A similar baffle 100 extends below the lower end of the baffle 96 and has its upper end connected to the upper portion of end plate 90. The baffle system 84 also includes other downwardly and outwardly sloping baffles 102 and 104 carried by the intermediate plate 92 in spaced parallel relation with respect to the baffles 94 and 96, respectively. This provides a tortuous path when insect entering into the receptacle 12 through the opening 86.

Referring now to Figures 1, 3 and 4 in particular, it will be seen that the insect attractive member 14 includes a bottom plate 106 which has secured to opposite ends thereof end plates 108 and 110. Extending between the upper ends of the end plates 108 and 110 and secured thereto is a top plate 112. The top plate 112 is covered by a suitable waterproof covering 114 which is preferably of an inverted channel shaped cross section. The sides of the insect attractive member 14 are formed by a suitable screen material 116.

Mounted on the bottom plate 106 and extending substantially the full length thereof is a fluorescent lamp fixture 118 carrying a fluorescent lamp 120. Disposed in overlying relation with respect to the fluorescent lamp 120 is a screen panel 122 which is suspended from the top plate 112 by suitable hooks 124. The screen panel is provided at the lower end thereof with a reinforcing strip 126 which is best illustrated in Figure 2.

In order that the insect attractive member 14 may be secured on the receptacle 12, the end plates 108 are provided with suitable angle brackets 128, as is best illustrated in Figure 3. The angle brackets 128 seat on the end frame members 22 and 24 and are suitably secured thereto to releasably retain the insect attractive member 14 in place. Connected to the fluorescent light fixture 118 is an electric cord 130 for providing electrical source for the fluorescent lamp 120.

In order that the bug and mosquito catcher 10 may be made very attractive to bugs, particularly tobacco bugs, the screen panel 122 is colored on both sides thereof with a suitable paint or coating which is considered a signal green fluorescent coating and is best described in the patent to William A. Pohlman, No. 2,645,877, issued July 21, 1953. Further, the lower portions of the screen material 116 are provided with a suitable coating 127 as is best illustrated in Figures 2 and 3. The mesh 58 and 60 is coated with the same coating as at 129 and 131, respectively, the coating being on both sides of the mesh 58 and 60 for a purpose to be described in more detail hereinafter.

In the operation of the present invention, the fluorescent lamp 120 is energized so as to cast the desired light upon the screen panel 122 and the coatings 127, 129 and 131. The reflection from the screen panel 122 will attract insects, such as mosquitos, tobacco bugs and the like to the catcher 10 from a distance. Once the insects strike the insect attractive member 14, they are then attracted to the coatings 127, 129 and 131 and are induced to enter the catcher. As the insects pass between the coatings 127, 129 and 131, they will pass over the entrance opening 86 to the receptacle 12 and a large number will fall through the opening 86 down through the baffle system 84 and into the interior of the receptacle 12. Once the insects enter the receptacle 12, they will then be attracted to the coatings 129, and 131 on the bottom of the mesh 58 and 60 and will pass upwardly around the baffles 80 and 82 so as to prevent their possible escape until they are too weak to find their way back through the baffle system 84.

In the southern part of the country where tobacco bugs are quite prominent, the particular invention has been found to be very useful. In addition to catching tobacco bugs and mosquitos, the catcher 10 also catches relatively large bugs which feed upon the tobacco bugs and mosquitos. As these large bugs eat the smaller insects, the parts of the bodies not eaten will pass through the relatively coarse mesh 78. In this manner the larger bugs in their feeding on the small insects will affect the self cleaning of the receptacle 12 through the large mesh of the bottom wall 48. The large bugs and what few other insects which are not eaten by the large bugs may be periodically cleaned out through the clean out plate 78 which will be removed for this purpose.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A bug catcher comprising a receptacle, said receptacle including a top wall having a central opening therein, an upstanding insect attractive member carried by said receptacle in overlying spaced relation to said opening, and insect attractive paint on said top wall on opposite sides of said opening cooperating with said insect attractive member to induce bugs to enter said opening.

2. A bug catcher comprising a receptacle, said receptacle including a top wall having a central opening therein, an upstanding insect attractive member carried by said receptacle in overlying spaced relation to said opening, and insect attractive paint on said top wall on opposite sides of said opening cooperating with said insect attractive member to lead bugs into said opening, said receptacle including overlapping baffles underlying said opening restraining the return of bugs through said opening.

3. A bug catcher comprising a receptacle, said receptacle including a top wall having a central opening therein, an upstanding insect attractive member carried by said receptacle in overlying spaced relation to said opening, and insect attractive paint on said top wall on opposite sides of said opening cooperating with said insect attractive member to lead bugs into said opening, said top wall being formed of screen material, said paint being also on the underside of said top wall, depending baffles separating said painted underside of said top wall from said opening whereby bugs in said receptacle are attracted away from said opening.

4. A bug catcher comprising a receptacle, said receptacle including a top wall having a central opening therein, an upstanding insect attractive member carried by said receptacle in overlying spaced relation to said opening, and insect attractive paint on said top wall on opposite sides of said opening cooperating with said insect attractive member to lead bugs into said opening, said top wall being formed of screen material, said paint being also on the underside of said top wall, depending baffles separating said painted underside of said top wall from said opening whereby bugs in said receptacle are attracted away from said opening, at least two other baffles extending between and secured to said depending baffles in underlying relation to said opening, said other baffles being vertically spaced and in effect partially overlapping relation to restrain the return of bugs through said openings.

5. A bug catcher comprising a receptacle, said receptacle including a top wall having a central opening therein, an upstanding insect attractive member carried by said receptacle in overlying spaced relation to said opening, and insect attractive paint on said top wall on opposite sides of said opening cooperating with said insect attractive member to lead bugs into said opening, said receptacle including upright walls and a bottom wall, all of said walls being formed of a wire mesh, said bottom wall being formed of wider mesh wire mesh than said top and upright walls whereby said receptacle is self cleaning.

6. A bug catcher comprising a receptacle, said receptacle including a bottom wall, upright walls and a top wall having a bug inlet opening therein, an upstanding insect attractive member carried by said receptacle in overlying spaced relation to said opening, and insect attractive paint on said top wall on opposite sides of said opening cooperating with said insect attractive member to lead bugs into said opening, all of said walls being formed of a wire mesh, the wire mesh of said top and upright walls being of a size to prevent the passage of small bugs, said bottom wall being formed of wider mesh wire mesh than said top and upright walls whereby said receptacle is self-cleaning.

References Cited in the file of this patent

UNITED STATES PATENTS

| | | |
|---|---|---|
| 2,025,769 | O'Dell | Dec. 31, 1935 |
| 2,645,877 | Pohlman | July 21, 1953 |
| 2,731,762 | Jones | Jan. 24, 1956 |